United States Patent
Al et al.

(10) Patent No.: US 8,996,039 B2
(45) Date of Patent: Mar. 31, 2015

(54) PAGING METHOD AND DEVICE

(75) Inventors: Ming Al, Beijing (CN); Chunshan Xiong, Beijing (CN); Juan Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 307 days.

(21) Appl. No.: 13/143,801

(22) PCT Filed: Jan. 8, 2010

(86) PCT No.: PCT/CN2010/000034
§ 371 (c)(1),
(2), (4) Date: Aug. 9, 2011

(87) PCT Pub. No.: WO2010/078834
PCT Pub. Date: Jul. 15, 2010

(65) Prior Publication Data
US 2011/0294523 A1    Dec. 1, 2011

(30) Foreign Application Priority Data
Jan. 9, 2009    (CN) .......................... 2009 1 0076582

(51) Int. Cl.
*H04W 68/00*    (2009.01)
*H04W 68/02*    (2009.01)

(52) U.S. Cl.
CPC .................................... *H04W 68/02* (2013.01)
USPC ...................... 455/458; 455/456.1; 455/456.5

(58) Field of Classification Search
CPC ..... H04W 68/00; H04W 68/02; H04W 68/04; H04W 68/06; H04W 68/08; H04W 68/005
See application file for complete search history.

(56) References Cited

U.S. PATENT DOCUMENTS

2005/0036517 A1 *   2/2005   Larmala et al. ............... 370/502
2008/0220782 A1 *   9/2008   Wang et al. ................... 455/436
(Continued)

FOREIGN PATENT DOCUMENTS

CN    101043703 A    9/2007
CN    101170816 A    4/2008
(Continued)

OTHER PUBLICATIONS

3rd Generation Partnership Project; Technical Specification Group Radio Access Network; Evolved Universal Terrestrial Radio Access Network (E-UTRAN); S1 Application Protocol (S1AP) (Release 8); 3GPP TS 36.413 V8.4.0; Dec. 1, 2008, pp. 39-40.*
Search Report for International Patent Application No. PCT/CN2010/000034; Apr. 15, 2010.

*Primary Examiner* — Mazda Sabouri
(74) *Attorney, Agent, or Firm* — Barnes & Thornburg LLP (57) ABSTRACT

A paging method and device are disclosed, and the technical solution includes: determining to page an user equipment (UE) by using international mobile subscriber identity (IMSI), and before the paging, judging whether tracking area identity list (TAI List) of the UE is stored, and if the judgment result is "no", then paging the UE in the tracking area (TA) served by the base station connected with the local area. Adopting the technical solution enables to effectively resolve the problem of uncertainness of paging an UE in which TAs, wherein the problem exists in the existing technology, and happens when mobility management entity (MME) pages the UE by using IMSI during the process of network error recovery.

5 Claims, 7 Drawing Sheets

(56) References Cited

U.S. PATENT DOCUMENTS

| | | | |
|---|---|---|---|
| 2008/0261629 A1* | 10/2008 | Tian et al. | 455/458 |
| 2010/0075698 A1* | 3/2010 | Rune et al. | 455/458 |
| 2010/0098023 A1* | 4/2010 | Aghili et al. | 370/331 |
| 2011/0165878 A1* | 7/2011 | Nylander et al. | 455/436 |
| 2011/0171979 A1* | 7/2011 | Rune | 455/458 |

FOREIGN PATENT DOCUMENTS

| | | |
|---|---|---|
| WO | 2007092807 A2 | 8/2007 |
| WO | 2008093750 A1 | 8/2008 |

\* cited by examiner

PAGING METHOD AND DEVICE

PRIORITY CLAIM

This patent application is a U.S. National Phase of International Patent Application No. PCT/CN2010/000034, filed Jan. 8, 2010, which claims priority to Chinese Patent Application No. 200910076582.0, filed with the Chinese Patent Office on Jan. 9, 2009, and entitled "PAGING METHOD AND DEVICE", the disclosures of which are incorporated herein by reference in their entirety.

FIELD

The present invention relates to the field of mobile communications, and particularly to a paging method and device.

BACKGROUND

In Standard Specification 3GPP TS24.301, it is specified that a Mobility Management Entity (MME) that manages a User Equipment (UE) may include a New Tracking Area Identity List (NEW TAI List) allocated to the UE and the Globally Unique Temporary Identity (GUTI) of the UE in a GUTI Reallocation Command message and deliver the message to the UE. If the MME detects a Lower Layer Failure before it receives a GUTI Reallocation Complete message fed back by the UE, then in order to establish a Non Access Stratum (NAS) signaling connection between the UE and the network side, the MME may page the UE by using the International Mobile Subscriber Identity (IMSI) of the UE.

Additionally, during Tracking Area Update (TAU) procedure, the MME may include the NEW TAI List allocated to the UE and the GUTI of the UE in a Tracking Area Update Accept (TAU Accept) message and deliver the message to the UE. If the MME detects a Lower Layer Failure before receiving a TAU Complete message fed back by the UE, then the MME pages the UE by using the OLD GUTI or NEW GUTI of the UE; if results of the paging with the OLD GUTI and the NEW GUTI both present a paging failure, then the MME pages the UE by using the IMSI of the UE, and the UE may access to the network again after receiving the paging from the MME.

A mobility management context of the UE containing a TAI LIST of the UE is stored in the MME. During the procedure of paging the UE, the MME determines Tracking Areas (TAs) in which the UE is registered from the TAI LIST in the mobility management context, and then sends a paging message in those TAs in which the UE is registered. During the above GUTI Reallocation procedure and TAU procedure, if no NEW TAI List is allocated to the UE by the MME, then the existing TAI List of the UE stored in the MME is effective, that is, the OLD TAI List is effective, and paging the UE by the MME using the IMSI of the UE is in those TAs corresponding to those Tracking Area Identities (TAIes) contained in the OLD TAI List; or if a NEW TAI List is allocated to the UE by the MME, and the MME is unable to determine the effectiveness of the NEW TAI List and the OLD TAI List after detecting a Lower Layer Failure, that is, the MME cannot determine whether the NEW TAI List allocated to the UE is effective or the existing OLD TAI List of the UE is effective, then the MME cannot determine TAs in which the MME may page the UE by using the IMSI of the UE.

Additionally, if the MME loses the mobility management context of the UE due to such reasons as restart, or if the mobility management context of the UE is corrupted, it may cause the MME unable to determine the TAI LIST of the UE. Thus, the MME cannot determine the TAs in which the MME may page the UE by using the IMSI of the UE, either.

When a network error, for example, Lower Layer Failure or MME Restart, is detected, the UE may be unable to access to the network, and at this point, it needs to page the UE in order to make the UE to access the network again. In conclusion, during the above network error recovery procedure, a situation in which the MME cannot determine the TAI List of the UE when the MME pages the UE by using the IMSI of the UE may exist, and at this point, the MME cannot determine TAs in which the MME pages the UE.

SUMMARY

Embodiments of the invention provide a paging method, which solves a problem in the prior art that an MME cannot determine TAs in which the MME pages a UE, when the MME pages the UE by using the IMSI of the UE during network error recovery procedure.

Correspondingly, embodiments of the invention further provide a paging device.

The technical solutions of the embodiments of the invention are as follows.

A paging method, including: determining to page a UE by using an IMSI; and if it is judged that no TAI list of the UE is stored before paging, then paging the UE in tracking areas served by base stations connected locally.

A paging device, including: a determination unit, for determining whether to page a UE by using an IMSI; a judging unit, for judging before paging whether a TAI List of the UE is stored, after the determination unit determines to page the UE by using the IMSI; and a paging unit, for paging the UE in tracking areas served by base stations connected locally, when a result of the judging by the judging unit is negative.

A paging method, including: delivering a new TAI List allocated to a UE to the UE; and paging the UE using an IMSI in TAs corresponding to TAIes contained in an existing TAI List of the UE and in the new TAI List allocated to the UE, after a network error is detected.

A paging device, including: a delivering unit, for delivering a new TAI List allocated to a UE to the UE; a detecting unit, for detecting whether a network error occurs; and a paging unit, for paging the UE using an IMSI in TAs corresponding to TAIes contained in an existing TAI List of the UE and in the new TAI List allocated to the UE, after the detecting unit detects a network error.

In the technical solutions of the embodiments of the invention, it firstly determines to page a UE by using an IMSI, and before paging, it judges whether a TAI List of the UE is stored, and if the judgment result is "not", it pages the UE in TAs served by base stations locally connected, so that during network error recovery procedure, even if no TAI List of a UE is stored when a MME pages the UE by using an IMSI, corresponding base stations may be instructed to page the UE in TAs served by the base stations, thereby making the UE able to access to the network again after receiving a paging from the MME; the technical solutions of the embodiments of the invention further put forward that, a NEW TAI List allocated to a UE is delivered to the UE, and after a network error is detected, the UE is paged by using an IMSI in TAs corresponding to TAIes contained in an existing OLD TAI List of the UE and in the NEW TAI List allocated to the UE, so that during network error recovery procedure, corresponding base stations can be indicated to page the UE in the TAs corresponding to the TAIes contained in the OLD TAI List and in the NEW TAI List by using the IMSI, even if the effectiveness of the OLD TAI List and the NEW TAI List cannot be determined, thereby making the UE able to access to the network again after receiving a paging from the MME.

DETAILED DESCRIPTION

The main realization principles, the specific embodiments and the beneficial effects that may be attained correspondingly will be described in detail in conjunction with each of the drawings.

In the embodiments of the invention, the GUTI and TAI List contained in a GUTI Reallocation Command message or a TAU Accept message may be combined in the following three modes.

Combination Mode 1: OLD GUTI and NEW TAI List, i.e., the MME only allocates a NEW TAI List to a UE, with no NEW GUTI allocated;

Combination Mode 2: NEW GUTI, i.e., the MME only allocates a NEW GUTI to a UE, with no NEW TAI List allocated;

Combination Mode 3: NEW GUTI and NEW TAI List, i.e., the MME allocates both a NEW GUTI and a NEW TAI List to a UE.

Figure 1:
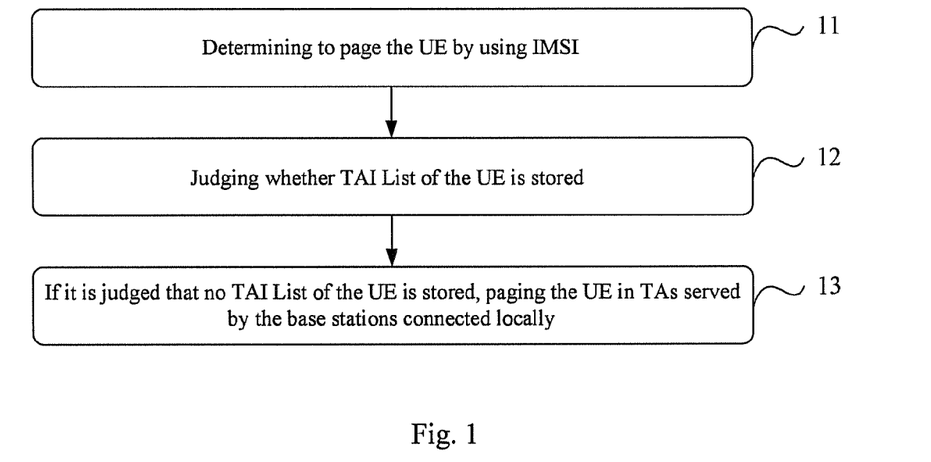
FIG. 1 is a schematic diagram of a flow chart of a method for paging a UE by using the IMSI of the UE in Embodiment 1 of the invention.

As shown in FIG. 1, a flow chart of a method for paging a UE by using the IMSI of the UE in Embodiment 1 of the invention is illustrated and includes the following operations 11-13.

Operation 11: determining to page the UE by using the IMSI of the UE;

Operation 12: before paging, firstly judging whether a TAI List of the UE is stored, wherein the TAI list of the UE may be a NEW TAI List or an OLD TAI List, or a NEW TAI List and an OLD TAI List;

Particularly, Embodiment 1 of the invention may be, but not limited to, GUTI Reallocation procedure or TAU procedure. During GUTI Reallocation procedure or TAU procedure, after the NEW GUTI and/or NEW TAI List allocated to the UE are/is delivered to the UE, and a Lower Layer Failure is detected, it determines to page the UE by using the IMSI of the UE, wherein the NEW TAI List and/or NEW TAI List allocated to the UE are/is delivered to the UE in the following three implementation situations.

The first implementation situation is corresponding to the above Combination Mode 1, and specifically: the existing OLD GUTI of the UE and the NEW TAI List allocated to the UE are included in a GUTI Reallocation Command message or a TAU Accept message and delivered to the UE;

The second implementation situation is corresponding to the above Combination Mode 2, and specifically: the NEW GUTI allocated to the UE is included in a GUTI Reallocation Command message or a TAU Accept message and delivered to the UE;

The third implementation situation is corresponding to the above Combination Mode 3, and specifically: the NEW GUTI allocated to the UE and the NEW TAI List allocated to the UE are included in a GUTI Reallocation Command message or a TAU Accept message and delivered to the UE.

If a Lower Layer Failure is detected during the time period between the issuing of the GUTI Reallocation Command message and the receiving of the GUTI Reallocation Complete message fed back by the UE, it needs to pages the UE by using the IMSI of the UE, in order to establish an NAS signaling connection between the UE and the network side; if a Lower Layer Failure is detected during the time period between the issuing of the TAU Accept message and the receiving of the TAU Complete message fed back by the UE and the results of paging the UE by using the OLD GUTI or NEW GUTI of the UE both present a paging failure, it needs to page the UE by using the IMSI of the UE.

Operation 13: if a result of the judging presents that no TAI List of the UE is stored, then the UE is paged in TAs served by base stations connected locally. Herein, the base stations connected locally refer to base stations connected with the MME, and a base station connected to an MME is also referred to as an eNodeB.

If the MME loses the mobility management context data of the UE due to such reasons as restart, or if the mobility management context data of the UE is corrupted, then no TAI List of the UE is stored in the MME.

Particularly, the operation of paging the UE in the TAs served by the connected base stations may contain, but not limited to, the following two implementation situations.

Implementation Situation 1: Firstly, a parameter for indicating a base station to page in a TA or TAs served by the base station is inserted into a Paging message that is to be sent to the base station connected locally, and then Paging messages inserted with the above parameter are sent to the base stations connected locally respectively, wherein the above parameter may be inserted into the field TAI List of the Paging message or a newly added field of the Paging message;

Implementation Situation 2: Firstly, TAIes corresponding to TAs served by the base stations connected locally are determined respectively from a stored corresponding relationship between identities of base stations and TAIes, and then the determined TAIes corresponding to the TAs served by a corresponding base station are inserted into a Paging message that is to be sent to the base station connected locally, and then the Paging message inserted with the TAIes is sent to the corresponding base station.

More specific embodiments will be given below.

Figure 2:
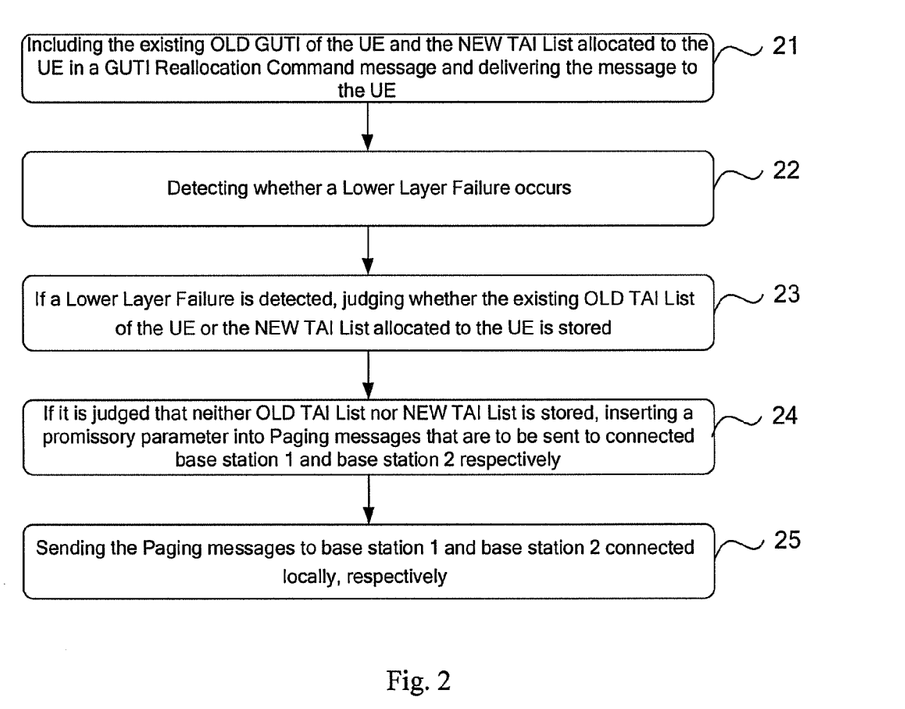
FIG. 2 is a schematic diagram of a specific flow chart of a first paging method for paging a UE by using the IMSI of the UE in Embodiment 1 of the invention.

If the base stations connected locally are base station 1 and base station 2, wherein the TAs served by base station 1 are TA1 and TA2, and the TAs served by base station 2 are TA3 and TA4. As shown in FIG. 2, a specific realization flow chart of a first paging method for paging a UE by using the IMSI of the UE in Embodiment 1 of the invention is illustrated and includes the following operations 21-25.

Operation 21: including the existing OLD GUTI of the UE and the NEW TAI List allocated to the UE in a GUTI Reallocation Command message and delivering the message to the UE;

Operation 22: detecting whether a Lower Layer Failure occurs;

Operation 23: if a Lower Layer Failure is detected in Operation 22, judging whether the existing OLD TAI List of the UE or the NEW TAI List allocated to the UE is stored;

Operation 24: if it is judged in Operation 23 that neither the existing OLD TAI List of the UE nor the NEW TAI List allocated to the UE is stored, inserting a promissory parameter into Paging messages that are to be sent to the connected base station 1 and base station 2 respectively, wherein the promissory parameter is used for indicating base station 1 and base station 2, after receiving the Paging messages respectively, to page the UE in the TAs served respectively by base station 1 and base station 2, wherein the promissory parameter may be inserted into the field TAI List of the Paging message, and the promissory parameter may be 0 or a parameter with a particular meaning, for example, a certain letter or number, etc.; Additionally, the promissory parameter may also be inserted into a newly added field of the Paging message, i.e., an indication information unit is newly added to the Paging message;

Operation 25: sending the Paging messages to base station 1 and base station 2 connected locally, respectively; after receiving the Paging message, base station 1 pages the UE in TA1 and TA2 by using the IMSI in the field UE Paging Identity of the Paging message according to the promissory parameter in the Paging message; and after receiving the Paging message, base station 2 pages the UE in TA3 and TA4 by using the IMSI in the field UE Paging Identity of the Paging message according to the promissory parameter in the Paging message.

Figure 3:
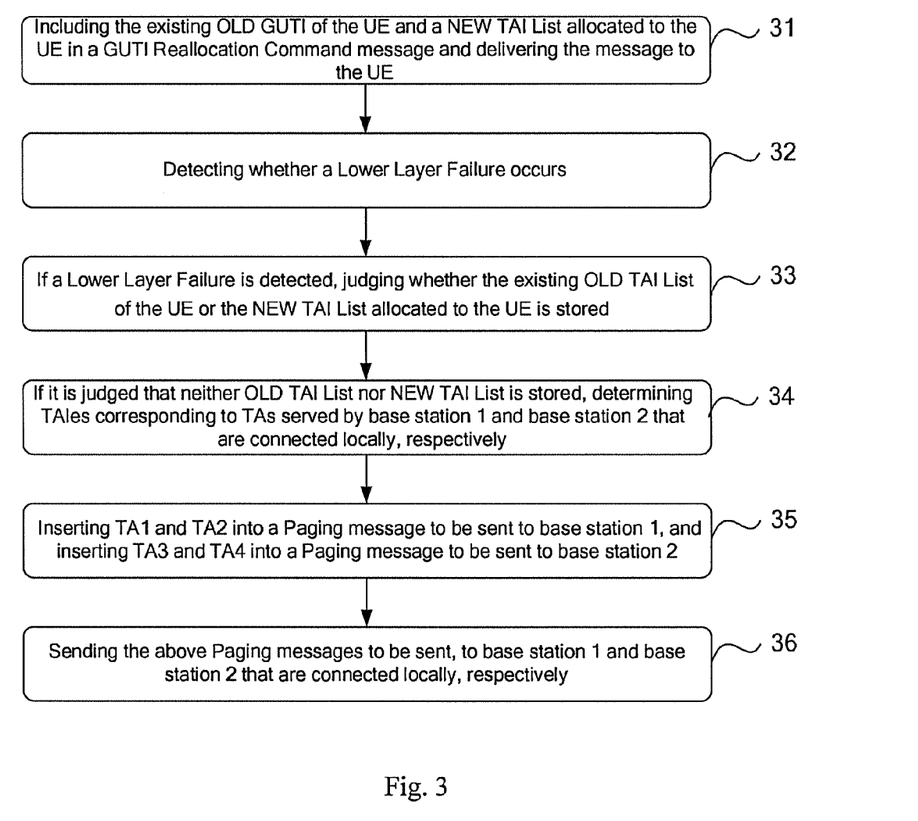
FIG. 3 is a schematic diagram of a specific flow chart of a second paging method for paging a UE by using the IMSI of the UE in Embodiment 1 of the invention.

As shown in FIG. 3, a specific realization flow chart of a second paging method for paging a UE by using the IMSI of the UE in Embodiment 1 of the invention is illustrated and includes the following operations 31-36.

Operation 31: including the existing OLD GUTI of the UE and a NEW TAI List allocated to the UE in a GUTI Reallocation Command message and delivering the message to the UE;

Operation 32: detecting whether a Lower Layer Failure occurs;

Operation 33: if a Lower Layer Failure is detected in Operation 32, judging whether the existing OLD TAI List of the UE or the NEW TAI List allocated to the UE is stored;

Operation 34: if it is judged in Operation 23 that neither the existing OLD TAI List nor the NEW TAI List allocated to the UE is stored, then determining from a stored corresponding relationship between identities of base stations and TAIs that the TAs served by base station 1 are TA1 and TA2 and the TAs served by base station 2 are TA3 and TA4, respectively;

Operation 35: inserting TA1 and TA2 into the field TAI List of a Paging message to be sent to base station 1, and inserting TA3 and TA4 into the field TAI List of a Paging message to be sent to base station 2;

Operation 36: sending the above Paging messages to be sent, to base station 1 and base station 2 that are connected locally, respectively; after receiving the Paging message, base station 1 pages the UE in TA1 and TA2 by using the IMSI in the field UE Paging Identity of the Paging message according to TA1 and TA2 in the field TAI List of the Paging message; and after receiving the Paging message, base station 2 pages the UE in TA3 and TA4 by using the IMSI in the field UE Paging Identity of the Paging message according to TA3 and TA4 in the field TAI List of the Paging message.

In the technical solution provided in Embodiment 1 of the invention, it first determines to pages the UE by using the IMSI of the UE, and before paging, it judges whether a TAI List of the UE is stored, if the judgment result is "not", it pages the UE in TAs served by the base stations connected locally, so that when an MME pages a UE by using the IMSI of the UE during network error recovery procedure, a corresponding base station may be indicated to page the UE in TAs served by the base station, even if no TAI List of the UE is stored, thereby making the UE able to access to the network again after receiving a paging from the MME.

Figure 4:
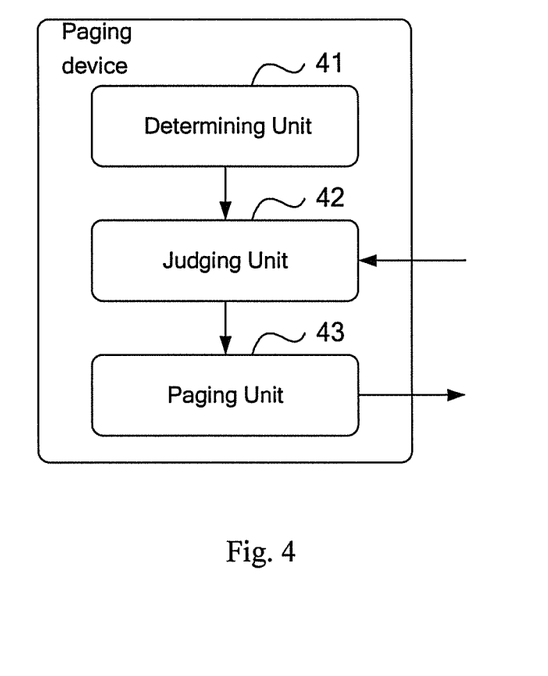
FIG. 4 is a schematic diagram of the structure of a paging device in Embodiment 1 of the invention.

Embodiment 1 of the invention further provides a paging device, as shown in FIG. 4, the paging device including: a determination unit 41, a judging unit 42 and a paging unit 43, wherein:

the determination unit 41 is used to determine whether to page a UE by using the IMSI of the UE;

the judging unit 42 is used to judge whether a TAI List of the UE is stored before paging, after the determination unit 41 determines to page the UE by using the IMSI of the UE; and the paging unit 43 is used to page the UE in TAs served by base stations connected locally when the judgment result of the judging unit 42 is negative;

The paging unit 43 may specifically include a first insertion subunit and a first sending subunit, wherein the first insertion subunit is used to insert a parameter for indicating each of the base stations to page in the TAs served by the base station, into Paging messages that are to be sent to the base stations connected locally respectively; and the first sending subunit is used to send the Paging messages inserted with the above parameter by the first insertion subunit, to the base stations that are connected locally, respectively.

The paging unit 43 may specifically include a determination subunit, a second insertion subunit and a second sending subunit, wherein the determination subunit is used to determine TAIs corresponding to the TAs served by respective base stations connected locally; the second insertion subunit is used to insert the TAIs corresponding to the TAs served by the respective base stations that are determined by the determination subunit, into Paging messages that are to be sent to the respective base stations connected locally; and the second sending subunit is used to send the Paging messages inserted with the TAIes by the second insertion subunit, to the respective base stations.

Figure 5:
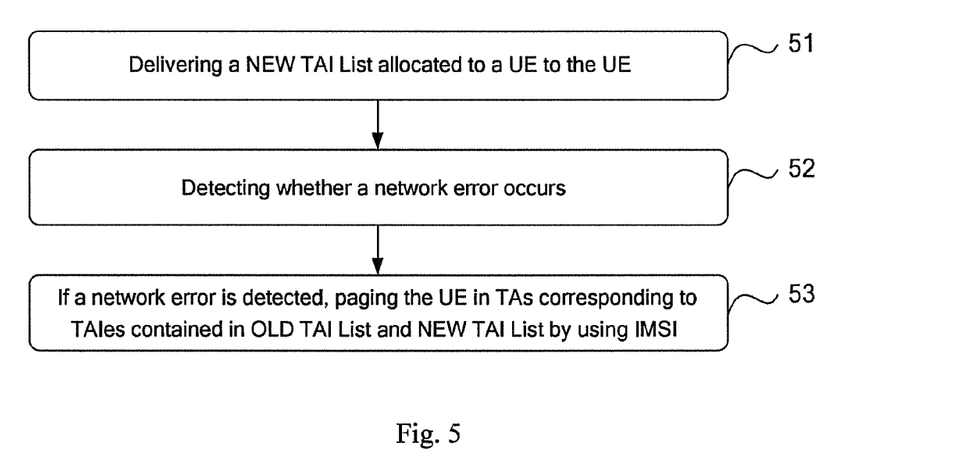
FIG. 5 is a schematic diagram of a flow chart of a method for paging a UE by using the IMSI of the UE in Embodiment 2 of the invention.

As shown in FIG. 5, a flow chart of a method for paging a UE by using the IMSI of the UE in Embodiment 2 of the invention is illustrated and includes the following operations 51-53.

Operation 51: delivering a NEW TAI List allocated to a UE to the UE;

Particularly, the NEW TAI List allocated to the UE is delivered to the UE in the following two implementation situations:

the first implementation situation is corresponding to Combination Mode 1 of the GUTI and TAI List contained in the GUTI Reallocation Command message or the TAU Accept message, and specifically: the existing OLD GUTI of the UE and the NEW TAI List allocated to the UE are included in a GUTI Reallocation Command message or a TAU Accept message and delivered to the UE;

the second implementation situation is corresponding to Combination Mode 3 of the GUTI and TAI List contained in the GUTI Reallocation Command message or the TAU Accept message, and specifically: the NEW GUTI allocated to the UE and the NEW TAI List allocated to the UE are included in a GUTI Reallocation Command message or a TAU Accept message and delivered to the UE.

Operation 52: detecting whether a network error occurs;

Particularly, the network error may be, but not limited to, a Lower Layer Failure, if a Lower Layer Failure is detected during the time period between the issuing of the GUTI Reallocation Command message and the receiving of the GUTI Reallocation Complete message fed back by the UE, it needs to pages the UE by using the IMSI of the UE, in order to establish an NAS signaling connection between the UE and the network side; if a Lower Layer Failure is detected during the time period between the issuing of the TAU Accept message and the receiving of the TAU Complete message fed back by the UE, and the results of paging the UE by using the OLD GUTI or NEW GUTI of the UE both present page failure, it needs to page the UE by using the IMSI of the UE;

Operation 53: if a network error is detected in Operation 52, it pages the UE in TAs corresponding to TAIes contained in the existing OLD TAI List of the UE and in the NEW TAI List allocated to the UE, by using the IMSI of the UE;

Particularly, the operation of paging the UE in the TAs corresponding to the TAIes contained in the existing OLD TAI List of the UE and in the NEW TAI List allocated to the UE may be, but not limited to, the following process:

it first determines, from a corresponding relationship between base station identities and TAIes, TAIes corresponding to TAs served by respective base stations and included in the TAs corresponding to the TAIes contained in the existing OLD TAI List of the UE and in the NEW TAI List allocated to the UE, and then it inserts the TAIes corresponding to the TAs served by the respective base stations and included in the TAs corresponding to the TAIes contained in the existing OLD TAI List of the UE and in the NEW TAI List allocated to the UE, into Paging messages to be sent to the respective base stations, and sends the above Paging messages inserted with the TAIes to the respective base stations.

More specific embodiments will be given below.

Figure 6:
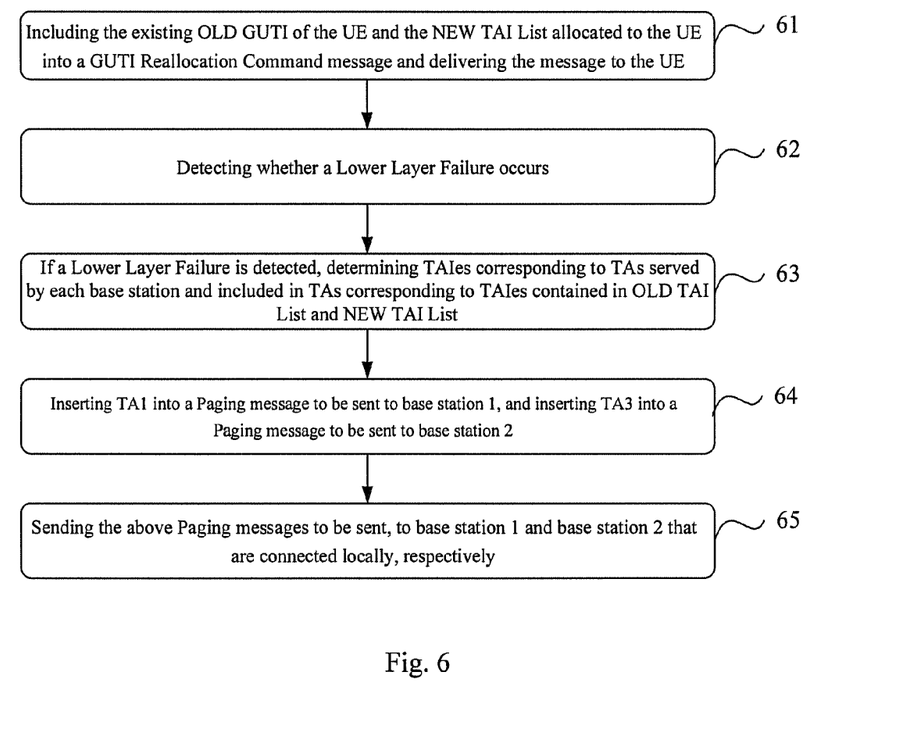
FIG. 6 is a schematic diagram of a specific flow chart of a paging method for paging a UE by using the IMSI of the UE in Embodiment 2 of the invention.

If the base stations connected are base station 1 and base station 2, the TAs served by base station 1 are TA1 and TA2, and the TAs served by base station 2 are TA3 and TA4, the TAI contained in the existing OLD TAI List of the UE is TA1, and the TAI contained in the NEW TAI List allocated to the UE is TA3. As shown in FIG. 6, a specific realization flow chart of a paging method for paging a UE by using the IMSI of the UE in Embodiment 2 of the invention is illustrated and includes the following operations 61-65.

Operation 61: including the existing OLD GUTI of the UE and the NEW TAI List allocated to the UE in a GUTI Reallocation Command message and delivering the message to the UE;

Operation 62: detecting whether a Lower Layer Failure occurs;

Operation 63: If a Lower Layer Failure is detected in Operation 62, it is determined, from a stored corresponding relationship between identities of base stations and TAIes, that the TA served by base station 1 and included in the TAs corresponding to the TAIes contained in the existing OLD TAI List of the UE and in the NEW TAI List allocated to the UE is TA1, and the TA served by base station 2 and included in the TAs corresponding to the TAIes contained in the existing OLD TAI List of the UE and in the NEW TAI List allocated to the UE is TA3, respectively;

Operation 64: inserting TA1 into the field TAI List of a Paging message to be sent to base station 1, and inserting TA3 into the field TAI List of a Paging message to be sent to base station 2;

Operation 65: sending the above Paging messages to be sent, to base station 1 and base station 2 that are connected locally, respectively; after receiving the Paging message, base station 1 pages the UE in TA1 by using the IMSI in the field UE Paging Identity of the Paging message according to TA1 in the field TAI List of the Paging message; after receiving the Paging message, base station 2 pages the UE in TA3 by using the IMSI in the field UE Paging Identity of the Paging message according to TA3 in the field TAI List of the Paging message.

Additionally, as corresponding to Combination Mode 2 of the GUTI and TAI List contained in the GUTI Reallocation Command message or the TAU Accept message, i.e., no NEW TAI List is allocated to the UE, only the existing OLD TAI List of the UE is stored; if a Lower Layer Failure is detected during the time period between the issuing of the GUTI Reallocation Command message and the receiving of the GUTI Reallocation Complete message fed back by the UE, it needs to pages the UE in TAs corresponding to TAIes contained in the OLD TAI List by using the IMSI of the UE, in order to establish an NAS signaling connection between the UE and the network side; if a Lower Layer Failure is detected during the time period between the issuing of the TAU Accept message and the receiving of the TAU Complete message fed back by the UE, and the results of paging the UE by using the OLD GUTI or NEW GUTI of the UE are both Paging Failed, it needs to page the UE in the TAs corresponding to the TAIes contained in the OLD TAI List by using the IMSI of the UE.

In the technical solution provided in Embodiment 2 of the invention, a NEW TAI List allocated to the UE is delivered to the UE, and after a Lower Layer Failure is detected, it pages the UE by using the IMSI of the UE in the TAs corresponding to the TAIes contained in the existing OLD TAI List of the UE and in the NEW TAI List allocated to the UE, so that when an MME pages a UE by using the IMSI of the UE, it may indicate corresponding base stations to page the UE in certain TAs even in the case that TAI List of the UE can not be determined, thereby making the UE able to access to the network again after receiving a paging from the MME.

Figure 7:
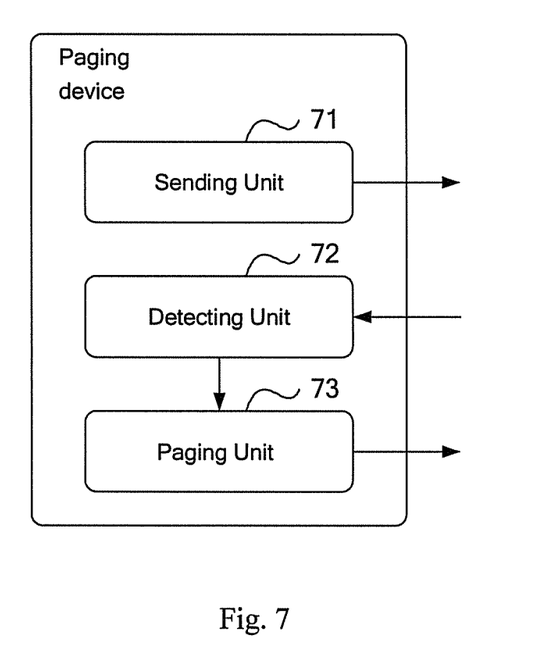
FIG. 7 is a schematic diagram of the structure of a paging device in Embodiment 2 of the invention.

Correspondingly, Embodiment 2 of the invention further provides a paging device, as shown in FIG. 7, the paging device including: a sending unit 71, a detecting unit 72 and a paging unit 73, wherein:

the sending unit 71 is used to deliver a NEW TAI List allocated to a UE to the UE;

the detecting unit 72 is used to detect whether a network error occurs; and the paging unit 73 is used to page the UE by using the IMSI of the UE in TAs corresponding to TAIes contained in the existing OLD TAI List of the UE and in the NEW TAI List allocated to the UE, after a network error is detected by the detecting unit 72.

The paging unit 73 may specifically include a determination subunit, a insertion subunit and a sending subunit, wherein the determining subunit is used to determine TAIes corresponding to TAs served by respective base stations and included in the TAs corresponding to the TAIes contained in the existing OLD TAI List of the UE and in the NEW TAI List allocated to the UE; the insertion subunit is used to insert the TAIes corresponding to the TAs served by the respective base stations and included in the TAs corresponding to the TAIes contained in the existing OLD TAI List of the UE and in the NEW TAI List allocated to the UE, which is determined by the determination subunit, into Paging messages to be sent to the respective base stations; and the sending subunit is used to send the Paging messages inserted with the TAIes by the insertion subunit to the respective base stations.

It should be noted that, the above embodiments are only used to illustrate the invention, rather than limiting the scope of the invention, and the invention is not limited to the above embodiments either; various technical solutions and modifications thereof without departing from the scope of the invention are all intended to be contemplated by the invention.

The invention claimed is:

1. A paging method, comprising:
   determining to page a User Equipment by using an International Mobile Subscriber Identity; and
   if it is judged that no Tracking Area Identity List of the User Equipment is stored before paging, then paging the User Equipment in only Tracking Areas served by base stations connected to an MME,
   wherein the paging the User Equipment in the only Track Areas served by the base stations connected to the MME comprises:
      inserting a parameter, for indicating a base station to page in Track Areas served by the base station, into paging messages that are to be sent to the base stations connected to the MME; and
      sending the paging messages inserted with the parameter to the base stations connected to the MME; or
   wherein the paging the User Equipment in the Track Areas served by the base stations connected to the MME comprises:
      determining Track Area Identities corresponding to the Track Areas served by the base stations connected to the MME, respectively;
      inserting determined Track Area Identities corresponding to the Track Areas served by the respective base stations, into paging messages that are to be sent to the respective base stations connected to the MME; and
      sending the paging messages inserted with the Track Area Identities to the respective base stations.

2. The paging method of claim 1, wherein, when the parameter, for indicating the base station to page in Track Areas served by the base station, is inserted into paging messages, the parameter is inserted into a field Track Area Identity List of the paging message.

3. The paging method of claim 1, wherein, when the parameter, for indicating the base station to page in Track Areas served by the base station, is inserted into paging messages, the parameter is inserted into a newly added field of the paging message.

4. The paging method of claim 1, wherein, when the determined Track Area Identities corresponding to the Track Areas served by the respective base stations are inserted into paging messages, the Track Area Identities are inserted into a field Track Area Identity List of the paging message.

5. A paging system, comprising a Mobility Management Entity, MME, which is configured to implement:
   a determining unit, for determining whether to page a User Equipment by using an International Mobile Subscriber Identity;
   a judging unit, for judging before paging whether a Track Area Identity List of the User Equipment is stored, after the determining unit determines to page the User Equipment by using the International Mobile Subscriber Identity; and
   a paging unit, for paging the User Equipment in only Tracking Areas served by base stations connected to the MME when a result of the judging by the judging unit presents that no Track Area Identity List of the User is stored,
   wherein, the paging unit comprises:
   a first inserting subunit, for inserting a parameter for indicating a base station to page in Track Areas served by the base station, into paging messages that are to be sent to the respective base stations connected to the MME; and
   a first sending subunit, for sending the paging messages inserted with the parameter by the first inserting subunit to the respective base stations connected to the MME; or
   wherein the paging unit comprises:
   a determining subunit, for determining Track Area Identities corresponding to the Track Areas served by the base stations connected to the MME respectively;
   a second inserting subunit, for inserting the Track Area Identities corresponding to the Track Areas served by the respective base stations that are determined by the determining subunit, into paging messages that are to be sent to the respective base stations connected to the MME; and
   a second sending subunit, for sending the paging messages inserted with the Track Area Identities by the second inserting subunit to the respective base stations.

* * * * *

UNITED STATES PATENT AND TRADEMARK OFFICE
CERTIFICATE OF CORRECTION

PATENT NO.        : 8,996,039 B2                              Page 1 of 1
APPLICATION NO.   : 13/143801
DATED             : March 31, 2015
INVENTOR(S)       : Ming AI et al.

It is certified that error appears in the above-identified patent and that said Letters Patent is hereby corrected as shown below:

On the title page, items (12) and (75), "Ming AL" should read --Ming AI--

Signed and Sealed this
First Day of September, 2015

Michelle K. Lee
*Director of the United States Patent and Trademark Office*